United States Patent
Drost et al.

(10) Patent No.: US 7,256,628 B2
(45) Date of Patent: Aug. 14, 2007

(54) SPEED-MATCHING CONTROL METHOD AND CIRCUIT

(75) Inventors: Robert J. Drost, Mountain View, CA (US); William S. Coates, Los Gatos, CA (US); Josephus C. Ebergen, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 10/671,641

(22) Filed: Sep. 26, 2003

(65) Prior Publication Data

US 2004/0145395 A1    Jul. 29, 2004

Related U.S. Application Data

(60) Provisional application No. 60/443,591, filed on Jan. 29, 2003.

(51) Int. Cl.
H03L 7/06 (2006.01)
(52) U.S. Cl. .......... 327/147; 327/156
(58) Field of Classification Search ........ 327/141, 327/144–149, 153, 155–158, 161–163; 375/376
See application file for complete search history.

(56) References Cited

U.S. PATENT DOCUMENTS

| | | | | |
|---|---|---|---|---|
| 4,151,473 A * | 4/1979 | Coleman et al. | 327/8 |
| 4,239,982 A * | 12/1980 | Smith et al. | 327/142 |
| 4,383,216 A | 5/1983 | Dorler et al. | 323/282 |
| 4,495,594 A * | 1/1985 | Eggebrecht et al. | 713/400 |
| 4,521,745 A | 6/1985 | Falconer | 331/2 |
| 4,635,186 A * | 1/1987 | Oman et al. | 714/10 |
| 5,332,978 A * | 7/1994 | Yabuki et al. | 331/2 |
| 5,631,591 A * | 5/1997 | Bar-Niv | 327/158 |
| 6,009,532 A * | 12/1999 | Self et al. | 713/400 |
| 6,112,308 A * | 8/2000 | Self et al. | 713/400 |
| 6,194,969 B1 * | 2/2001 | Doblar | 331/2 |
| 6,208,183 B1 * | 3/2001 | Li et al. | 327/161 |
| 6,239,626 B1 * | 5/2001 | Chesavage | 327/99 |
| 6,346,838 B1 * | 2/2002 | Hwang et al. | 327/156 |
| 6,489,821 B1 * | 12/2002 | Kurd et al. | 327/157 |
| 6,516,422 B1 * | 2/2003 | Doblar et al. | 713/503 |
| 6,538,516 B2 * | 3/2003 | Lenk | 331/2 |
| 6,577,174 B2 * | 6/2003 | Locker et al. | 327/141 |
| 6,707,330 B2 * | 3/2004 | Nakanishi | 327/158 |
| 6,757,350 B1 * | 6/2004 | Chesavage | 375/376 |
| 6,925,135 B2 * | 8/2005 | Smith et al. | 375/354 |

FOREIGN PATENT DOCUMENTS

EP    0 380 979    8/1990
EP    04250053.8    4/2004

* cited by examiner

Primary Examiner—Kenneth B. Wells
(74) Attorney, Agent, or Firm—Park, Vaughan & Fleming LLP

(57) ABSTRACT

One embodiment of the present invention provides a system that matches speeds of asynchronous operation between a local chip and a neighboring chip. The system derives an internal frequency signal from an internal oscillator on the local chip, and receives an external frequency signal from a neighboring chip. The system then compares the internal frequency signal with the external frequency signal to generate a control signal, which is applied to the local chip to adjust the operating speed of the local chip, and applied to the internal oscillator to adjust the frequency of the internal oscillator.

24 Claims, 4 Drawing Sheets

SPEED-MATCHING CONTROL METHOD AND CIRCUIT

RELATED APPLICATION

This application hereby claims priority under 35 U.S.C. 119 to U.S. Provisional Patent Application No. 60/443,591, filed on 29 Jan. 2003, entitled "Speedmatching Control Method and Circuit," by inventors Robert J. Drost, Ivan E. Sutherland, and Josephus C. Ebergen

GOVERNMENT LICENSE RIGHTS

This invention was made with United States Government support under Contract No. NBCH020055 awarded by the Defense Advanced Research Projects Administration. The United States Government has certain rights in the invention.

BACKGROUND

1. Field of the Invention

The present invention relates to design of circuitry for asynchronous inter-chip communications. More specifically, the present invention relates to a method and apparatus for controlling and matching speeds of operation between different asynchronous chips.

2. Related Art

As computer system clock speeds become progressively faster, it is becoming increasingly harder to synchronize the actions of computer system components with reference to a centralized system clock. To deal with this problem, computer system designers are beginning to investigate the use of asynchronous circuits that operate in a self-timed manner, without having to adhere to the constraints imposed by a centralized system clock.

While asynchronous operation circumvents limitations imposed by a centralized system clock, it also introduces new problems, especially with regards to inter-chip communications. In particular, when two communicating asynchronous chips operate at different speeds, a slower receiving chip can encounter an input-buffer overflow if a faster transmitting chip transmits a large amount of data at a higher speed.

A number of factors contribute to differences in chip speeds. First, different fabrication technologies lead to different chip speeds. For example, chips fabricated using 350 nm CMOS technology are likely to operate at a different speed than chips fabricated using 130 nm CMOS technology. Furthermore, because of process variations during fabrication and environmental factors, such as temperature and power supply variations, even two chips fabricated using the same technology can operate at different speeds.

To maintain error-free communications between asynchronous chips while achieving good performance, it is desirable to operate all the chips at the highest possible speed without overflowing the input buffer of any given chip. This usually requires all of the asynchronous chips to operate at the maximum speed of the slowest chip.

Hence, what is needed is a method and apparatus for controlling and matching the speeds of operation between asynchronous chips.

SUMMARY

One embodiment of the present invention provides a system that matches speeds of asynchronous operation between a local chip and a neighboring chip. The system derives an internal frequency signal from an internal oscillator on the local chip, and receives an external frequency signal from a neighboring chip. The system then compares the internal frequency signal with the external frequency signal to generate a control signal, which is applied to the local chip to adjust the operating speed of the local chip, and applied to the internal oscillator to adjust the frequency of the internal oscillator.

In a variation of this embodiment, adjusting the frequency of the local chip involves changing the power-supply voltage of the local chip.

In a variation of this embodiment, receiving of the external frequency signal from the neighboring chip involves receiving the external frequency signal through a capacitor, an inductor, a resistor, a transmission line, or a direct contact.

In a variation of this embodiment, comparing the internal frequency signal with the external frequency signal involves converting the internal frequency signal and external frequency signal into corresponding current or voltage signals, which are proportional to the frequencies of the frequency signals.

In a variation of this embodiment, the system converts the internal frequency signal and the external frequency signal into corresponding current signals, and then compares the two current signals to generate a difference current signal. The difference current signal is then coupled to an integrating capacitor to produce an integrated voltage signal. The system also applies an offset current source to the integrating capacitor to compensate for transistor leakages, parasitics, and/or nonlinearities. The system further includes an amplifier which is coupled to the integrating capacitor, wherein the input to the amplifier is the integrated voltage signal and the output of the amplifier is the control signal.

In a further variation, the system filters the control signal to improve matching between the local chip's operating speed and the neighboring chip's operating speed.

In a variation of this embodiment, filtering the control signal involves coupling a filter capacitor between the control signal and ground.

In a variation of this embodiment, the internal frequency signal has a frequency that is a fraction of the internal oscillator frequency of the local node, and the external frequency signal has a frequency that is a fraction of an external oscillator frequency of the neighboring node.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Speed Control Circuit

Figure 1:
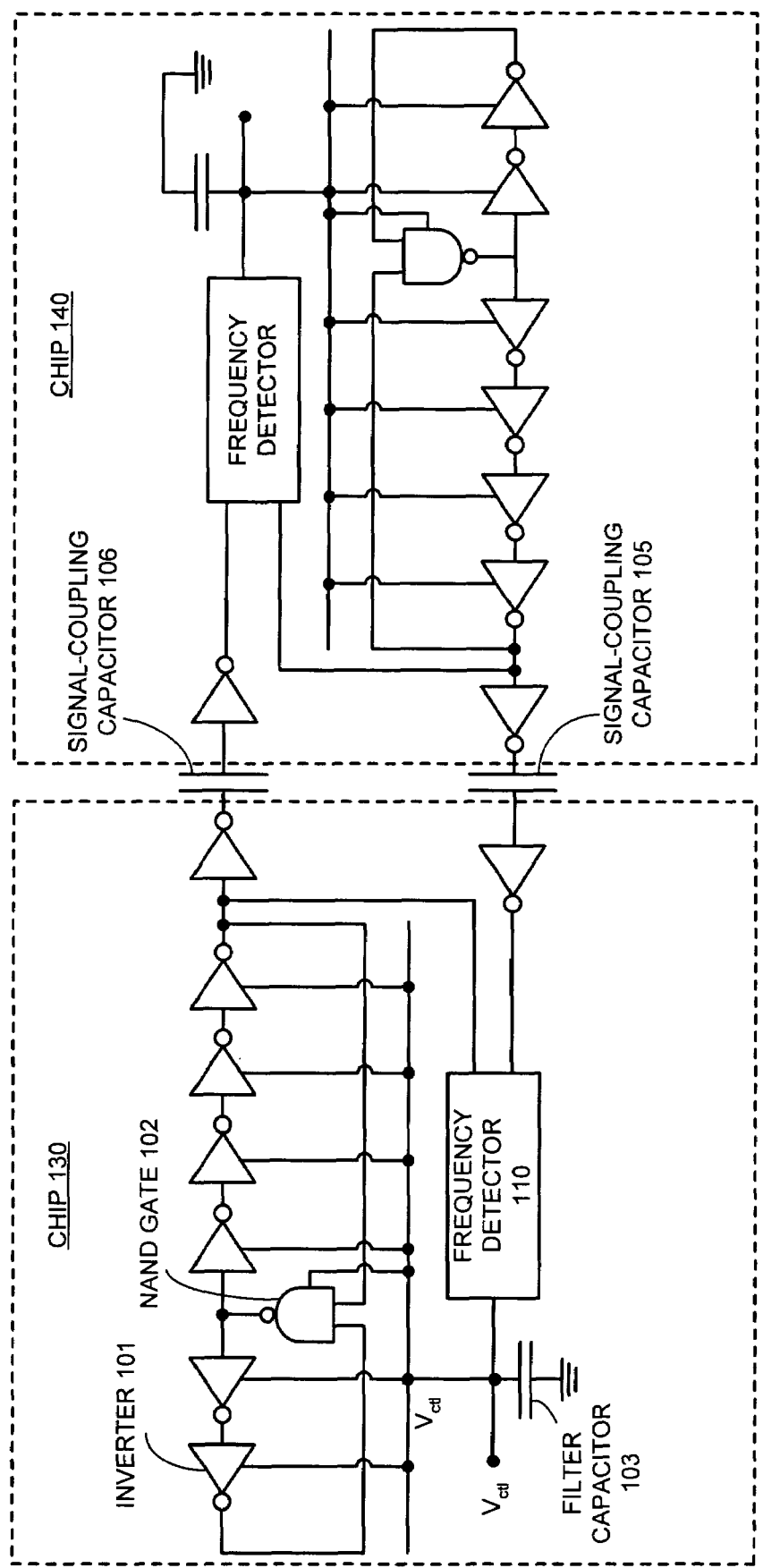
FIG. 1 illustrates a speed control circuit in accordance with an embodiment of the present invention.

FIG. 1 illustrates a speed control circuit in accordance with an embodiment of the present invention.

As is illustrated in FIG. 1, chips 130 and 140 contain the same speed control circuits which are coupled together to form a loop. Chips 130 and 140 are coupled together through capacitors 105 and 106. However, they can be coupled through any type of connection, for instance a resistor, an inductor, a transmission line, or just a simple wire.

Each half of the speed control loop comprises two parts: a variable frequency oscillator with a control input, and a frequency detector circuit 110. Additionally, there may be filtering elements, such as capacitors, resistors, or inductors, which are used to improve the stability, response time, and/or performance of the control loop. For example, in FIG. 1, a filter capacitor 103 is shown coupled to $V_{ctl}$ to smooth out ripples on the control voltages. Note that the frequency detector circuit can additionally include an internal integrating capacitor to improve the loop stability of the overall speed control loop.

The speed control loop operates as follows. The oscillator on each chip is designed to operate just below the chip's maximum operating speed when the control voltage input is at its maximum speed setting. The connections between chips transmit a signal whose frequency is the frequency of the oscillator. Each chip compares its internal oscillator frequency against the frequency transmitted by the other chip and, if necessary, slows down or speeds up its internal frequency to match the frequency of the other chip. The response time of these frequency corrections needs to be slow in comparison with delay involved in sending signals between chips to make the overall control loop stable.

Each chip starts by transmitting its maximum frequency. The slower chip will be unable to go any faster and its oscillator will simply continue to oscillate at the maximum speed. The faster chip will slow down to match the speed of the slower chip.

Inside chip 130 (chip 140 has a similar configuration), the local oscillator is comprised of an NAND gate 102 and a number of cascaded inverters, such as inverter 101. The cascaded inverters are coupled to the inputs of NAND gate 102, wherein distribution of inverters on each input of NAND gate 102 determines the duty cycle of the generated timing signal. The oscillator frequency is determined by the delays of inverters. Note that the delays of these inverters and NAND gate 101 can be controlled by varying the voltage of their power supply. Hence, by varying a common power-supply voltage, $V_{ctl}$, one can adjust the frequency of the timing signal generated by the oscillator.

Frequency Detector Circuit

Figure 2:
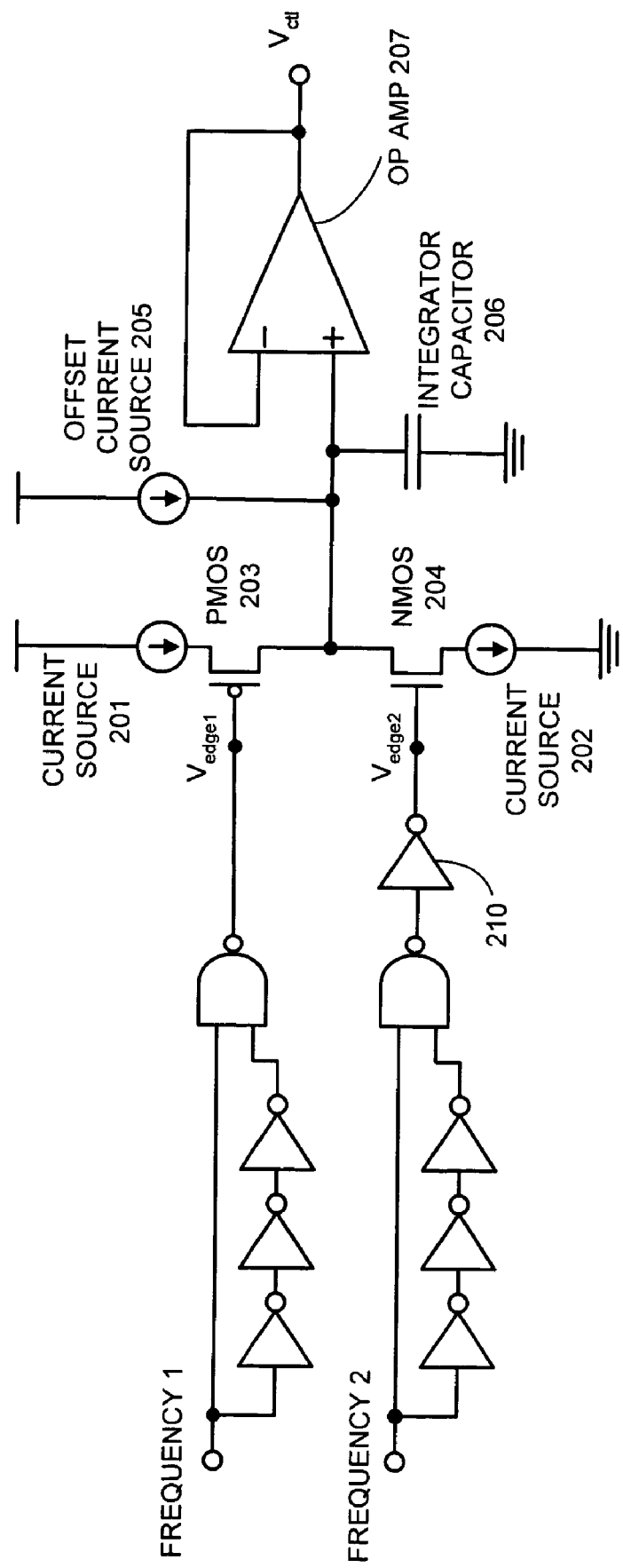
FIG. 2 illustrates a frequency detector circuit in accordance with an embodiment of the present invention.

FIG. 2 illustrates a frequency detector circuit in accordance with an embodiment of the present invention. This frequency detector first converts the frequency of each input signal into a current signal that is proportional to the respective signal's frequency. It then integrates them on a capacitor. Finally the integrated voltage is buffered by an amplifier before being used to adjust the internal oscillator frequency and the chip's operating speed. Note that this integration can help provide control loop stability.

One possible function for a frequency detector circuit that outputs a voltage control signal is to provide:

$$V_{out} = K_{FD}(\text{Freq1} - \text{Freq2})$$

wherein Freq 1 and Freq 2 are two input frequencies, and $K_{FD}$ is a constant.

As shown in FIG. 2, there are two input frequency signals: frequency 1 and frequency 2. These input frequency signals feed into respective edge detector circuits comprised of cascaded invertors and NAND gates. Each of these edge detector circuits produces a low voltage pulse on a rising edge of the input frequency signal. This configuration allows the output pulse signal's frequency to be proportional to the frequency of the input signal while the pulse width is independent of the input signal's duty cycle. This is because the width of the pulse is only determined by the delays of the inverters.

While frequency 1 is converted to a downward pulsed signal $V_{edge1}$, frequency 2 is converted to an upward pulsed signal $V_{edge2}$ with an additional inverter 210. $V_{edge1}$ is then coupled to the gate of PMOS transistor 203, the source of which is connected to current source 201. The purpose of this configuration is to turn on PMOS transistor 203 and to let a current flow into the drain of PMOS transistor 203 for the duration of the pulse whenever there is a rising edge in the input signal, frequency 1. Similarly, $V_{edge2}$ is coupled to the gate of NMOS transistor 204, the source of which is connected to current source 202, such that whenever there is a rising edge in frequency 2, NMOS transistor 202 is turned on and a current flows out of the drain of NMOS transistor 202.

The net effect of this PMOS and NMOS configuration is that a difference current signal is produced at the point where the drains of two transistors are coupled, and the time integral of this difference current is proportional to the difference between frequency 1 and frequency 2. To convert this difference current signal into a voltage signal, the circuit further includes an integrating capacitor 206. The voltage that appears across capacitor 206 reflects the time integral of the difference current signal.

The final output of the frequency detector circuit, $V_{ctl}$, is obtained from an operational amplifier (OP AMP) 207 configured as a unity-gain amplifier, wherein the input of the unity-gain amplifier is the voltage produced by integrating capacitor 206. $V_{ctl}$ is then used to adjust both the internal oscillator frequency and the operating speed of the asynchronous chip.

In theory, two chips could settle on any frequency at which both chips would operate. In reality, it is difficult to achieve a perfect match because of current leakages, parasitics, and nonlinearities. As a result in some cases, both chips would try to operate slightly more slowly than each other, and the control loop would consequently cause both chips' oscillators to slow down to a complete stop.

Thus, an important addition to this control loop is the introduction of offset current source 205, which is coupled to the integrating capacitor 206. As a result, the control loop may successively increase an oscillator's frequency to be just slightly higher than the other chip's frequency, and stop at where the slower chip's oscillator hits its maximum frequency. At that point, the control loop is nonlinear, and the faster chip will operate just a bit faster than that frequency.

The offset current causes frequency 1 signal to cycle slightly faster than the frequency 2 signal when the speed control loop is locked. This is important to prevent a certain error mode where both chips would try to go slightly more slowly than each other, and would eventually slow down to a complete stop. By biasing the frequency detector circuit, one can make each chip try to cycle slightly faster than the other. What happens instead is that the slow chip operates at its maximum frequency (because its control loop is pegged against its maximum speed of operation) and the fast chip operates slightly faster than that.

On the other hand, to ensure that the faster chip is not operating too fast, the frequency broadcast should be slightly slower than the chip's maximum speed of operation. For example, if the offset current causes the frequency control loop to attempt to operate 1% faster than the other chip, then the frequencies broadcast should be at least 1% slower than the chips' maximum frequencies.

Note that, during a possible start-up condition, if the faster chip is much faster than the slower chip, then the slower chip may not be able to recognize the faster chip's frequency. Instead, the slower chip may mistake the faster chip's frequency signal for a DC signal. In this case, the slower chip will initially slow down its speed. This, however, is acceptable, because the faster chip will slow down its speed of operation. Eventually the faster chip will slow down enough such that the slower chip can correctly recognize the faster chip's frequency. At this point the control loop will operate correctly and the slower chip's oscillator will speed back up to its maximum speed of operation.

An alternative to transmitting a chip's full oscillating frequency to other chips is transmitting a frequency that is a fraction of the chip's full oscillating frequency, wherein this transmitted frequency is proportional to the full oscillating frequency by a factor K. In this case, the frequency detector circuit in a receiving chip ideally generates a $V_{ctl}$ that makes its oscillator operate at a frequency that is K times as fast as the detected external frequency.

Example Waveforms

Figure 3A:
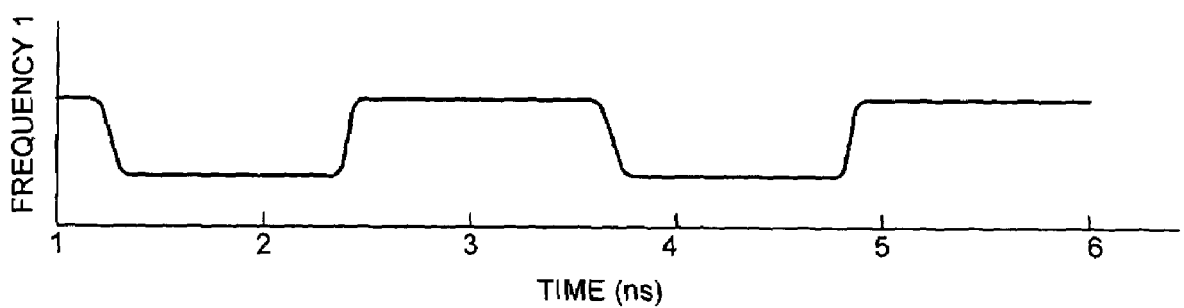
FIG. 3 illustrates exemplary waveforms at different stages of a frequency detector circuit in accordance with an embodiment of the present invention.
Figure 3B:
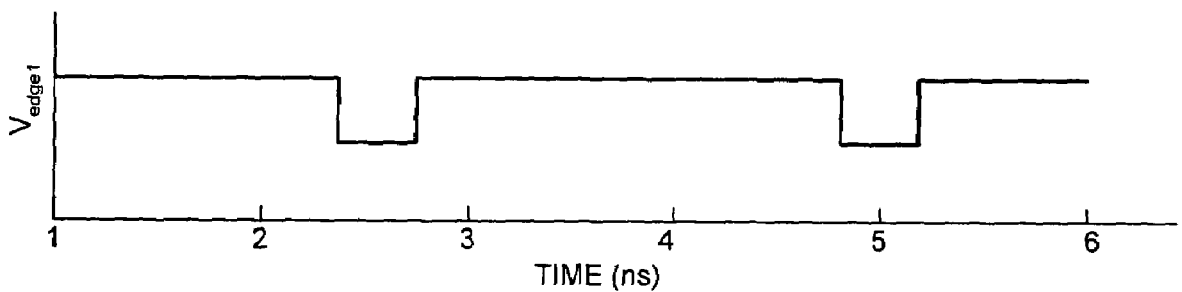

FIG. 3A shows the exemplary waveform of an input frequency signal coupled to the "frequency 1" input in FIG. 2. Correspondingly, FIG. 3B shows the waveform at $V_{edge1}$. Note that the pulse Of $V_{edge1}$ is a downward pulse, and the starting (falling) edge of a pulse corresponds to a rising edge of the input frequency signal. In addition, the pulse width is independent of the duty cycle of the input frequency signal.

Figure 3C:
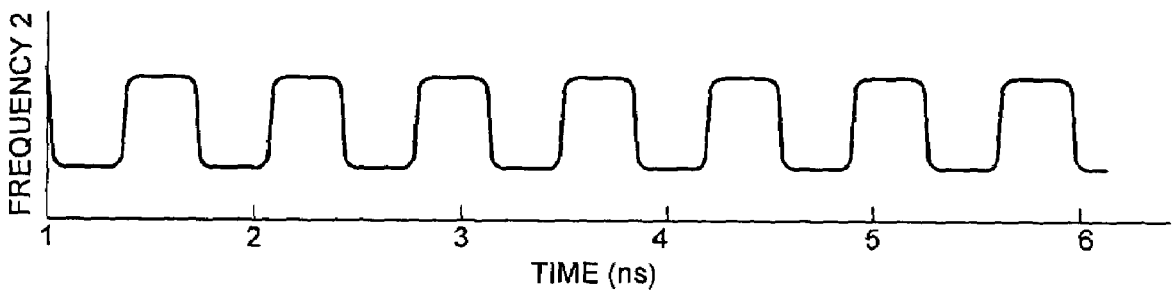
Figure 3D:
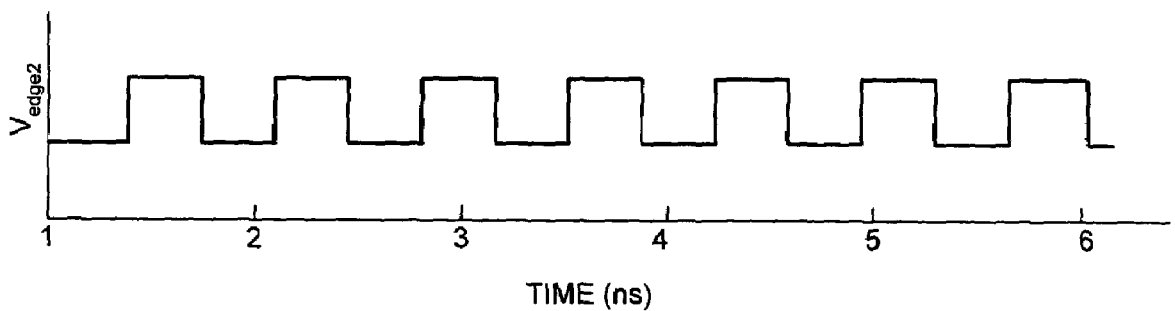

FIG. 3C shows the exemplary waveform of an input frequency signal coupled to the "frequency 2" input in FIG. 2. Correspondingly, FIG. 3D shows the waveform at $V_{edge2}$. Note that the pulse of $V_{edge2}$ is an upward pulse, and the starting (rising) edge of a pulse corresponds to a rising edge of the input frequency signal.

Figure 4:
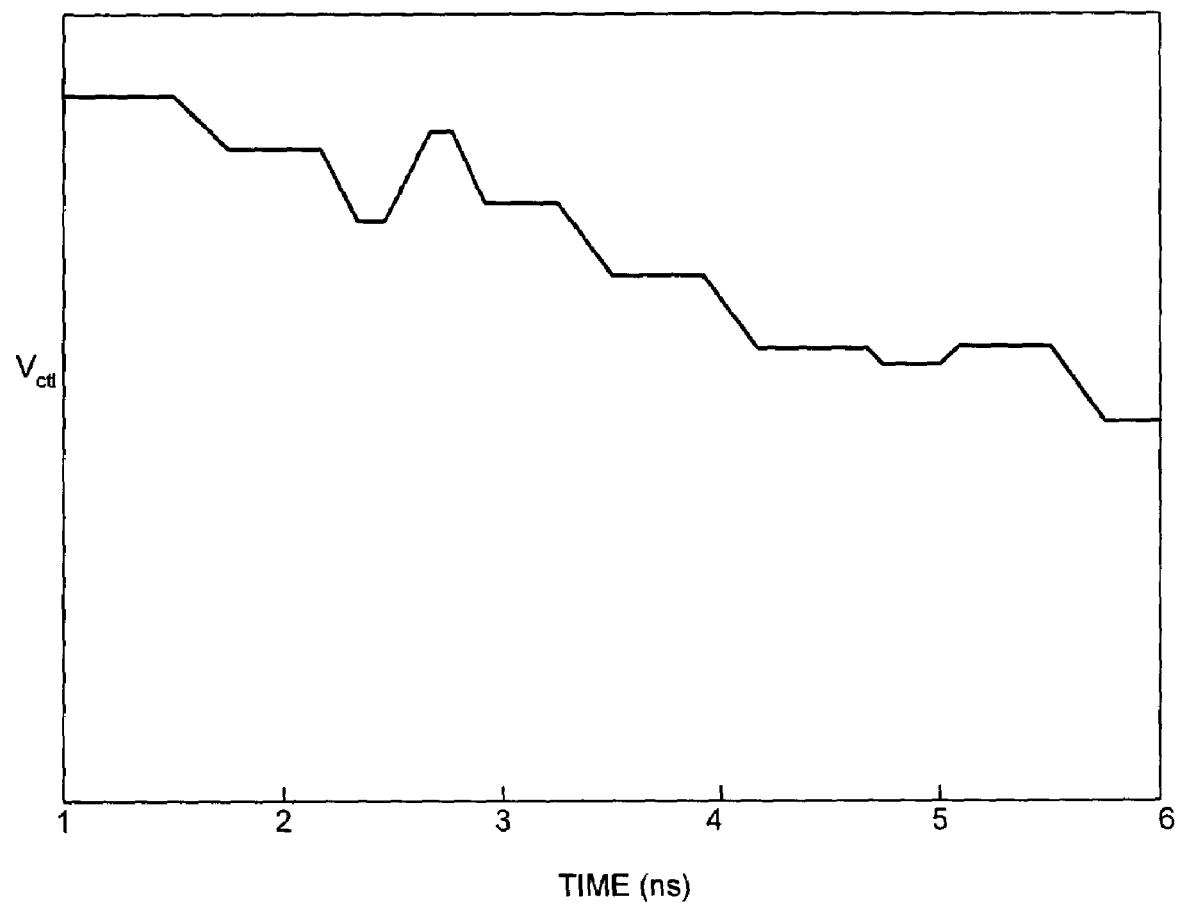
FIG. 4 illustrates an exemplary waveform for the output control voltage from a frequency detector circuit in accordance with an embodiment of the present invention.

FIG. 4 illustrates an exemplary waveform of the output control voltage ($V_{ctl}$) from a frequency detector in accordance with an embodiment of the present invention. In this example, $V_{ctl}$ is slowing down the local oscillator to match the speed of a slower chip.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for matching speeds of asynchronous operation between a local chip and a neighboring chip, the method comprising:
    deriving an internal frequency signal from an internal oscillator on the local chip;
    receiving an external frequency signal from a neighboring chip;
    comparing the internal frequency signal with the external frequency signal to generate a control signal; and
    adjusting the operating speed of the local chip by applying the control signal to the internal oscillator;
    wherein if the internal frequency signal is faster than the external frequency signal, the control signal causes the internal frequency signal to slow down;
    wherein the neighboring chip similarly adjusts the external frequency signal with respect to the internal frequency signal so that the local chip and the neighboring chip operate at a substantially maximum common frequency;
    wherein the local chip and the neighboring chip are coupled together in an asynchronous control loop, which determines the substantially maximum common frequency without reference to an external synchronous clock signal;
    wherein comparing the internal frequency signal with the external frequency signal involves applying the internal frequency signal to a first edge detector circuit which is used to gate a first current source;
    wherein comparing the internal frequency signal with the external frequency signal involves applying the external frequency signal to a second edge detector circuit which is used to gate a second current source; and
    wherein an integrating capacitor and an offset current source are used to ensure that the frequency signal with the higher maximum frequency will operate at just above the maximum frequency of the frequency signal with the lower maximum frequency.

2. The method of claim 1, wherein receiving the external frequency signal from the neighboring chip involves receiving the external frequency signal through a capacitor, an inductor, a resistor, a transmission line, or a direct contact.

3. The method of claim 1, wherein comparing the internal frequency signal with the external frequency signal involves converting the internal frequency signal and external frequency signal into corresponding current or voltage signals, which are proportional to the frequencies of the frequency signals.

4. The method of claim 3,
    wherein the internal frequency signal and the external frequency signal are converted into corresponding current signals;
    wherein comparing the internal frequency signal with the external frequency signal involves comparing the two current signals to generate a difference current signal; and
    wherein the method further comprises:
        coupling the difference current signal to an integrating capacitor to produce an integrated voltage signal;
        applying an offset current source to the integrating capacitor to compensate for transistor leakages, parasitics, and/or nonlinearities; and
        coupling the integrating capacitor to an amplifier, wherein the input to the amplifier is the integrated voltage signal and the output of the amplifier is the control signal.

5. The method of claim 1, further comprising filtering the control signal to improve matching between the local chip's operating speed and the neighboring chip's operating speed.

6. The method of claim 5, wherein filtering the control signal involves coupling a filter capacitor between the control signal and ground.

7. The method of claim 1, wherein
the internal frequency signal has a frequency that is a fraction of the internal oscillator frequency of the local chip; and wherein
the external frequency signal has a frequency that is a fraction of an external oscillator frequency of the neighboring chip.

8. The method of claim 1, wherein adjusting the frequency of the local chip involves changing the power-supply voltage of the local chip.

9. An apparatus for matching speeds of asynchronous operation between a local chip and a neighboring chip, the apparatus comprising:
an internal oscillator on the local chip, from which an internal frequency signal can be derived;
a receiving mechanism configured to receive an external frequency signal from a neighboring chip;
a comparison mechanism configured to compare the internal frequency signal with the external frequency signal to generate a control signal; and
an adjusting mechanism configured to adjust the operating speed of the local chip and the internal oscillator by applying the control signal to the internal oscillator;
wherein if the internal frequency signal is faster than the external frequency signal, the control signal causes the internal frequency signal to slow down;
wherein the neighboring chip similarly adjusts the external frequency signal with respect to the internal frequency signal so that the local chip and the neighboring chip operate at a substantially maximum common frequency; and
wherein the local chip and the neighboring chip are coupled together in an asynchronous control loop, which determines the substantially maximum common frequency without reference to an external synchronous clock signal;
wherein comparing the internal frequency signal with the external frequency signal involves applying the internal frequency signal to a first edge detector circuit which is used to gate a first current source;
wherein comparing the internal frequency signal with the external frequency signal involves applying the external frequency signal to a second edge detector circuit which is used to gate a second current source; and
wherein an integrating capacitor and an offset current source are used to ensure that the frequency signal with the higher maximum frequency will operate at just above the maximum frequency of the frequency signal with the lower maximum frequency.

10. The apparatus of claim 9, wherein the receiving mechanism is configured to receive the external frequency signal from the neighboring chip through a capacitor, and inductor, a resistor, a transmission line, or a direct contact.

11. The apparatus of claim 9, wherein the comparison mechanism is configured to convert the internal frequency signal and the external frequency signal into corresponding current or voltage signals, which are proportional to the frequencies of the frequency signals.

12. The apparatus of claim 11,
wherein the external frequency signal and the internal frequency signal are converted into corresponding current signals;
wherein the comparison mechanism is configured to compare the two
current signals to generate a difference current signal; and
wherein the apparatus further comprises:
an integrating capacitor to which the difference current signal is coupled to produce an integrated voltage signal;
an offset current source applied to the integrating capacitor to compensate for transistor leakages, parasitics, and/or nonlinearities; and
an amplifier to which the integrating capacitor is coupled, wherein the input to the amplifier is the integrated voltage signal and the output of the amplifier is the control signal.

13. The apparatus of claim 9, further comprising a filtering mechanism configured to filter the control signal to improve matching between the local chip's operating speed and the neighboring chip's operating speed.

14. The apparatus of claim 13, wherein the filtering mechanism includes a filter capacitor coupled between the control signal and ground.

15. The apparatus of claim 9, wherein
the internal frequency signal has a frequency that is a fraction of the internal oscillator frequency of the local chip; and wherein
the external frequency signal has a frequency that is a fraction of an external oscillator frequency of the neighboring chip.

16. The apparatus of claim 9, wherein the adjusting mechanism is configured to adjust the frequency of the local chip by changing the power-supply voltage of the local chip.

17. A computer system that includes a circuit for matching speeds of asynchronous operation between a local chip and a neighboring chip, the circuit comprising:
a central processing unit;
a semiconductor memory;
an internal oscillator circuit on the local chip, from which an internal frequency signal can be derived;
a receiver circuit for receiving an external frequency signal from a neighboring chip;
a comparison circuit for comparing the internal frequency signal with the external frequency signal to generate a control signal; and
an adjustment circuit for adjusting the operating speed of the local chip and the internal oscillator by applying the control signal to and the internal oscillator;
wherein if the internal frequency signal is faster than the external frequency signal, the control signal causes the internal frequency signal to slow down;
wherein the neighboring chip similarly adjusts the external frequency signal with respect to the internal frequency signal so that the local chip and the neighboring chip operate at a substantially maximum common frequency; and
wherein the local chip and the neighboring chip are coupled together in an asynchronous control loop, which determines the substantially maximum common frequency without reference to an external synchronous clock signal;
wherein comparing the internal frequency signal with the external frequency signal involves applying the internal frequency signal to a first edge detector circuit which is used to gate a first current source;
wherein comparing the internal frequency signal with the external frequency signal involves applying the external frequency signal to a second edge detector circuit which is used to gate a second current source; and
wherein an integrating capacitor and an offset current source are used to ensure that the frequency signal with the higher maximum frequency will operate at just above the maximum frequency of the frequency signal with the lower maximum frequency.

18. The computer system of claim 17, wherein the receiver circuit is configured to receive the external frequency signal from the neighboring chip through a capacitor, and inductor, a resistor, a transmission line, or a direct contact.

19. The computer system of claim 17, wherein the comparison circuit is configured to convert the internal frequency signal and the external frequency signal into corresponding current or voltage signals, which are proportional to the frequencies of the frequency signals.

20. The computer system of claim 19,
wherein the external frequency signal and the internal frequency signal are converted into corresponding current signals;
wherein the comparison circuit is configured to compare the two current signals to generate a difference current signal; and
wherein the computer system further comprises:
an integrating capacitor to which the difference current signal is coupled to produce an integral voltage signal;
an offset current source applied to the integrating capacitor to compensate for transistor leakages, parasitics, and/or nonlinearities; and
an amplifier to which the integrating capacitor is coupled, wherein the input to the amplifier is the integral voltage signal and the output of the amplifier is the control signal.

21. The computer system of claim 17, further comprising a filtering circuit for filtering the control signal to improve matching between the local chip's operating speed and the neighboring chip's operating speed.

22. The computer system of claim 21, wherein the filter circuit includes a filter capacitor coupled between the control signal and ground.

23. The computer system of claim 17, wherein
the internal frequency signal has a frequency that is a fraction of the internal oscillator frequency of the local chip; and wherein
the external frequency signal has a frequency that is a fraction of an external oscillator frequency of the neighboring chip.

24. The computer system of claim 17, wherein the adjustment circuit is configured to adjust the frequency of the local chip by changing the power-supply voltage of the local chip.

* * * * *